US010372514B2

(12) United States Patent
Mowatt et al.

(10) Patent No.: US 10,372,514 B2
(45) Date of Patent: *Aug. 6, 2019

(54) APPLICATION DATA SHARING AND DECISION SERVICE PLATFORM

(71) Applicant: MICROSOFT TECHNOLOGY LICENSING, LLC, Redmond, WA (US)

(72) Inventors: David Mowatt, County Dublin (IE); Stephen O'Driscoll, Bray (IE)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/693,768

(22) Filed: Sep. 1, 2017

(65) Prior Publication Data

US 2018/0081743 A1 Mar. 22, 2018

Related U.S. Application Data

(63) Continuation of application No. 15/268,912, filed on Sep. 19, 2016, now Pat. No. 9,778,964.

(51) Int. Cl.
*G06F 9/54* (2006.01)
*G06F 8/71* (2018.01)
(Continued)

(52) U.S. Cl.
CPC .............. *G06F 9/542* (2013.01); *G06F 8/71* (2013.01); *G06F 9/44505* (2013.01);
(Continued)

(58) Field of Classification Search
CPC ...................................... G06F 9/542
(Continued)

(56) References Cited

U.S. PATENT DOCUMENTS 7,546,582 B2  6/2009 Smith
8,954,732 B1  2/2015 Watsen et al.
(Continued)

FOREIGN PATENT DOCUMENTS

CN  103218220 A  7/2013
CN  104865837 A  8/2015
(Continued)

OTHER PUBLICATIONS

Preinterview First Office Action issued in U.S. Appl. No. 15/268,930, dated Aug. 16, 2018, 5 pages.
(Continued)

*Primary Examiner* — Andy Ho

(57) ABSTRACT

Systems, methods, and software are disclosed herein for facilitating dynamic sharing of application data among multiple isolated applications executing on one or more application platforms. In an implementation, a decision service monitors event configuration information corresponding to an event, monitors application data feeds provided by one or more producer applications associated with the event, detects an event reconfiguration trigger based on the one or more application data feeds, and responsive to the event reconfiguration trigger, automatically modifies the event configuration information. The decision service then directs at least on application platforms to invoke at least one data consumer application for execution of at least one actions based, at least in part, on the modified event configuration information.

20 Claims, 9 Drawing Sheets

(51) Int. Cl.
  *H04L 29/08* (2006.01)
  *G06F 9/445* (2018.01)
(52) U.S. Cl.
  CPC ........ *G06F 9/44563* (2013.01); *H04L 67/125* (2013.01); *H04L 67/26* (2013.01)
(58) Field of Classification Search
  USPC ......................................................... 719/318
  See application file for complete search history.

(56) References Cited

U.S. PATENT DOCUMENTS

| | | | |
|---|---|---|---|
| 8,984,113 | B2 | 3/2015 | Li et al. |
| 9,292,832 | B2 | 3/2016 | Goel et al. |
| 9,778,964 | B1 | 10/2017 | Mowatt et al. |
| 2005/0154557 | A1 | 7/2005 | Ebert |
| 2005/0229183 | A1 | 10/2005 | Araujo et al. |
| 2007/0168917 | A1 | 7/2007 | Janson |
| 2011/0314389 | A1 | 12/2011 | Meredith et al. |
| 2012/0072991 | A1 | 3/2012 | Belani et al. |
| 2014/0108943 | A1 | 4/2014 | Lee et al. |
| 2014/0259433 | A1 | 9/2014 | Nunn et al. |
| 2014/0282608 | A1 | 9/2014 | Biancalana et al. |
| 2014/0351790 | A1 | 11/2014 | Ghose et al. |
| 2015/0067154 | A1 | 3/2015 | Ly et al. |
| 2015/0296043 | A1 | 10/2015 | Kim et al. |
| 2016/0080500 | A1 | 3/2016 | Penilla et al. |
| 2016/0110645 | A1 | 4/2016 | Kim et al. |
| 2016/0239352 | A1 | 8/2016 | Evans |
| 2016/0381163 | A1 | 12/2016 | Mashtakov |
| 2018/0081911 | A1 | 3/2018 | Mowatt et al. |
| 2018/0084056 | A1 | 3/2018 | Mowatt et al. |

FOREIGN PATENT DOCUMENTS

| | | | |
|---|---|---|---|
| EP | 1515229 | A2 | 3/2005 |
| WO | 2008042984 | A2 | 4/2008 |
| WO | 2015108748 | A1 | 7/2015 |

OTHER PUBLICATIONS

Non Final Office Action issued in U.S. Appl. No. 15/268,950, dated Jul. 13, 2018, 9 Pages.
"Assistant App New Feature: Alarm Clock Now Offers Talking Alarm", Retrieved From: <<http://lwww.idigitaltimes.com/assistant-app-new-feature-alarm-clock-now-offers-talking-alarm-464355>>, Aug. 5, 2015, 10 Pages.
"Consumer IoT-AppCarousel", Retrieved From: <<http://appcaropusel.com/markets/consumer-iotl>>, Jan. 21, 2016, 6 Pages.
"Funstore—An application store for Internet of Things", Retrieved From: <<http://funstore.io/>>, Jun. 27, 2015, 5 Pages.
"Internet of Things—Oracle Cloud", In White Paper of Oracle, May 6, 2015, 5 Pages.
"My Cell Phone Told My Alarm Clock I Have a Client Meeting This Morning", Retrieved From: <<https://www.icontrol.com/blog/my-cell-phone-told-my-alarm/>>, Sep. 25, 2015, 2 Pages.
"Overview an End-to-End—Open Standards Based-Solution", Retrieved From: <<http://lwww.shaspa.com/overview/>>, Feb. 5, 2013, 2 Pages.
"Smart Connected Solutions for the Internet of Things (IoT)", Retrieved From: <<http://web.archive.org/web/20160322201404/http://www.nxp.com/applications/solutions-for-the-iot-and-adas/smart-connected-solutions-for-the-iot:SMART-CONNECTED-SOLUTIONS>>, May 11, 2016, 2 Pages.
"Thge Bosch IoT Suite: Technology for a Connected World", Retrieved From: <<http://www.bosch-si.com/media/en/bosch_software_innovations/documents/brochure/products_2/bosch_iot_suite/brochure.pdf>>, Mar. 2016, 12 Pages.
"Non-Final Office Action Issued in U.S. Appl. No. 15/268,912", dated Feb. 23, 2017, 8 Pages.
"Notice of Allowance Issued in U.S. Appl. No. 15/268,912", dated Jun. 2, 2017, 5 Pages.

Adkins, et al., "Demo Abstract: Michigan'IoT Toolkit", In Proceedings of the 13th ACM Conference on Embedded Networked Sensor Systems, Nov. 1, 2015, pp. 485-486.
Babu, Jacob, "This is How IoT is Going to Change Your Everyday Life", Retrieved From: <<http://www.attinadsoftware.com/blog/jacob-babu/how-iot-going-change-your-everyday-life%E2&80%A6>>, Biv, 26, 2015, 6 Pages.
Biswas, et al., "The Internet of Things: Impact and Applications in the High-Tech Industry", In White Paper of Cognizant, Mar. 2015, pp. 1-11.
Blackstock, et al., "MAGIC Broker2: An Open and Extensible Platform for The Internet of Things", In Proceedings of Internet of Things, Nov. 29, 2010, 8 Pages.
Challapalli, Kiran, "Informix—The Intelligent Database for IoT", Retrieved From <<https://ibm.com/developerworks/community/files/form/anonymous/api/library/58ffa024-61c5-447c-b28f-00bc287ee09/document/a9f0af7a-db6a-4d92-9123-4cec52e2605f/media>>, May 11, 2016, 27 Pages.
Crook, Jordan, et al., "Poncho Launces an Alarm App So You Can Wake Up to Weather Forecasts", Retrieved From: <<http://techcrunch.com/2016/02/02/poncho-launches-an-alarm-app-so-you-can-wake-up-to-weather-forecasts/>>, Feb. 2, 2016, 6 Pages.
Goodner, Marc, "Internet of Things—Develop an Azure-Connected IoT Solution in Visual Studio with C++", In the Proceedings of MSDN Magazine, vol. 31, No. 4, Apr. 2016, 10 Pages.
Guo, et al., "A Study of Middleware for Pluggable UI in IoT-Enabled Environment", In Proceedings of the IEEE 11th International Conference one-Business Engineering, Nov. 5, 2014, pp. 326-330.
Ha, et al., "A perspective on the IoT services through a multi-dimensional analysis", In Proceedings of the 2015 Conference on research in adaptive and convergent systems, Oct. 9, 2015, pp. 479-481.
Jacobsen, et al., "Oracle Internet of Things Cloud Service is Now Available", Retrieved From: <<https://blogs.orcle.com/fusionmiddleware/entry/oracle_internet_of_things_cloud>>, Jan. 5, 2016, 6 Pages.
John, Rex ST, "App Stores are Coming to the Internet of Things", Retrieved From: <<https://blogs.intel.com/evangelists/2015/06/19/app-stores-are-coming-to-the-internet-of-things/>>, Jun. 19, 2015, 4 Pages.
Kanchibotla, et al., "Internet of Things—catalyst to intelligent decision making", Retrieved From: <<http://www.mu-sigma.com/analytics/thought_leadership/decision-sciences-Internet-of-Things.html>>, Apr. 28, 23014, 4 Pages.
Kang, et al., "An Interactive Trust Model for Application Market of the Internet of Things", In Journal of IEEE transactions on Industrial Informatics, vol. 10, Issue 2, May 2014, pp. 1516-1526.
Khanna, et al., "The Internet of Things for Medical Devices—Prospects, Challenges and the Way Forward", In White Paper of Tata, Mar. 2015, pp. 1-12.
Lavars, Nick, "Luna Smart Mattress Cover Takes Internet of Things to Bed", Retrieved From: <<http://gizmag.com/luna-smart-mattress-cover/35813/>>, Jan. 27, 2015, 2 Pages.
Madakam, Somayya, "Internet of Things: Smart Things", In the International Journal of Future Computer and Communication vol. 4, No. 4, Aug. 2015, pp. 250-253.
Verbelen, Tim, "Building the Internet of Things with OSGi", Retrieved From: <<https://jaxenter.com/building-the-internet-of-things-with-osgi-123620.html>>, Feb. 2, 2016, 10 Page.
Sharma, Prashant, "Internet of Things 101: Understanding the Building Blocks of the Connected World", Retrieved From: <<https://www.microsoftventures.com/blog/entry/InternetofThings101UnderstandingtheBuildingBlocksoftheConnectedworld7C1064>>, Jun. 14, 2014, 3 Pages.
Sodoma, Brian, "The Internet of Things (IoT): When your Alarm Clock Talks, The Coffee Machine Listens", Retrieved From: <<https://www.azcentral.com/story/sponsor-story/best-buy/2016/05/02/best-buy-internet-of-things/83844056>>, May 2, 2016, 1 Page.
Van Dijk, et al., "A Scalable Framework for Provisioning Large-Scale IoT Deployments", In Journal of ACM Transactions on Internet Technology, vol. 16, Issue 2, Mar. 2016, 20 Pages.

(56) References Cited

OTHER PUBLICATIONS

"International Search Report and Written opinion Issued in PCT Application No. PCT/US2017/051236", dated Dec. 12, 2017, 14 Pages.

"International Search Report and Written Opinion Issued in PCT Application No. PCT/US2017/051237", dated Nov. 20, 2017, 10 Pages.

"International Search Report and Written opinion Issued in PCT Application No. PCT/US2017/051238", dated Dec. 11, 2017, 14 Pages.

APPLICATION DATA SHARING AND DECISION SERVICE PLATFORM

RELATED APPLICATIONS

This application is a continuation of, and claims priority to, U.S. patent application Ser. No. 15/268,912, filed on Sep. 19, 2016, and entitled "APPLICATION DATA SHARING AND DECISION SERVICE PLATFORM," which is incorporated by reference in their entirety.

CROSS-REFERENCE TO RELATED APPLICATIONS

This application is related to co-pending U.S. patent application Ser. No. 15/268,930 entitled "DEPLOYMENT OF APPLICATIONS CONFORMING TO APPLICATION DATA SHARING AND DECISION SERVICE PLATFORM SCHEMA," and U.S. patent application Ser. No. 15/268,950 entitled "SYSTEMS AND METHODS FOR SHARING DATA BETWEEN ISOLATED APPLICATIONS EXECUTING ON ONE OR MORE APPLICATION PLATFORMS," which were filed on Sep. 19, 2016, the contents of which are expressly incorporated by reference herein.

BACKGROUND

The Internet of Things (IoT) generally refers to the use of sensors, actuators, and communication technology embedded into physical objects such that the objects are enabled to be tracked or controlled over networks, e.g., the Internet. In almost all realms of our daily lives, devices are becoming increasingly internet-connected. From light switches to music players, from weather sensors to cattle monitors, a wealth of data is available when IoT devices provide rich information or when IoT device are controlled via the Internet.

In parallel, the application (or "app") store phenomena has led independent software vendors (ISVs) to create applications that can process various types data and user input ranging from traffic congestion apps, gate opening apps, messaging apps, music streaming and play list apps, and the like.

Unfortunately, these applications are generally disconnected or isolated from one another—even when operating on the same application platform or device. For example, a smartphone device may contain various downloaded apps that rarely, if ever, have the capability to talk to one another. A few vendors have developed applications designed to support non-user initiated interactions with other applications. However, these applications are limited in what triggers the interactions and what actions the applications are able to take in response to the triggers.

Overall, the examples herein of some prior or related systems and their associated limitations are intended to be illustrative and not exclusive. Upon reading the following, other limitations of existing or prior systems will become apparent to those of skill in the art.

OVERVIEW

Examples discussed herein relate to a decision service for sharing application data among multiple isolated applications executing on one or more application platforms. In an implementation, an application data sharing platform includes a decision service that monitors event configuration information corresponding to an event, the event configuration information including an event setting that identifies one or more actions to be executed by one or more consumer applications and timing information indicating when the one or more actions are to be executed. The decision service further monitors application data feeds provided by one or more producer applications associated with the event, detects an event reconfiguration trigger based on the one or more application data feeds, and responsive to the event reconfiguration trigger, automatically modifies the event configuration information. The decision service then directs at least one of the one or more application platforms to invoke at least one of the one or more data consumer applications for execution of at least one of the one or more actions based, at least in part, on the modified event configuration information.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

In order to describe the manner in which the above-recited and other advantages and features can be obtained, a more particular description is set forth and will be rendered by reference to specific examples thereof which are illustrated in the appended drawings. Understanding that these drawings depict only typical examples and are not therefore to be considered to be limiting of its scope, implementations will be described and explained with additional specificity and detail through the use of the accompanying drawings.

DETAILED DESCRIPTION

Examples are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a machine-implemented method, a computing device, or a computer readable medium.

The techniques described herein facilitate dynamic sharing of application data among multiple isolated applications executing on one or more application platforms through the use of a central data sharing platform. Among other capabilities, the central data sharing platform is configured to receive, combine, process and dynamically facilitate communication of the application data between applications registered with the system.

At least one technical effect discussed herein is the ability for applications to dynamically communicate without limitations as to what triggers interactions or what actions the applications are able to take in response to the triggers.

Figure 1:
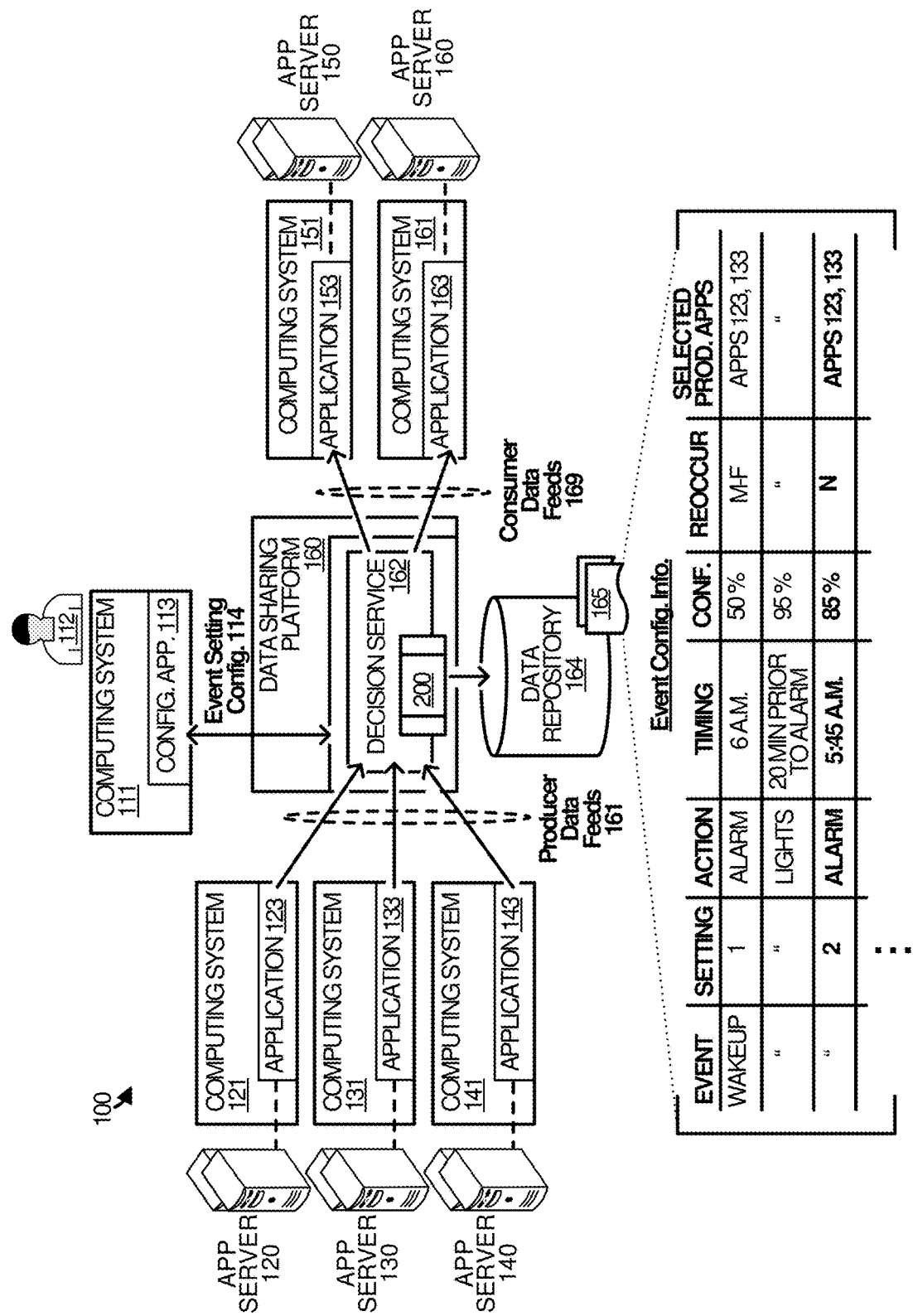
FIG. 1 depicts a block diagram illustrating an example operational architecture for sharing application data among multiple isolated applications executing on one or more application platforms (or computing systems), according to some embodiments.

FIG. 1 depicts a block diagram illustrating an example operational architecture 100 for sharing application data among multiple isolated applications executing on one or more application platforms (or computing systems), according to some embodiments. The example operational architecture 100 includes a single isolated application (e.g., producer, consumer, or configuration application) executing on each computing system. However, it may be appreciated that any number of isolated applications can execute on each computing system.

The example operational architecture 100 includes computing systems 111, 121, 131, 141, 151 and 161, a data sharing platform 160, and application ("app") servers 120, 130, 140, 150 and 160. The data sharing platform 160 includes a data repository 164. As shown in the example of FIG. 1, computing systems 121, 131 and 141 include producer applications 123, 133 and 143, respectively. Computing systems 151 and 161 include consumer applications 153 and 163, respectively. Although not shown, the producer applications 123, 133 and 143, and consumer applications 153 and 163 can each include an application program interface (API) representative of an interface through which the computing systems may communicate with the data sharing platform 160—or directly with each other in some instances. Among other implementations, the API may be an add-in application that runs in the context of a producer application or consumer application, an integrated component of the application, or a component of an operating system or some other application on a computing system.

The data sharing platform 160 is representative of a service or collection or services that facilitates sharing of application data feeds among otherwise isolated applications that are registered. Among other functions, the data sharing platform 160 includes a decision service 162 comprising a predictive analysis engine (not shown) capable of processing producer data feeds 161, blending the feeds, and automatically configuring or reconfiguring event configuration information for the consumer applications.

The data sharing platform 160 may include server computers, blade servers, rack servers, and any other type of computing system (or collection thereof) suitable for carrying out or facilitating sharing of application data feeds among otherwise isolated applications as described herein. Such systems may employ one or more virtual machines, containers, or any other type of virtual computing resource in the context of supporting enhanced group collaboration of which computing system 901 is representative.

Computing systems 111, 121, 131, 141, 151 or 161, are representative of any computing devices suitable for employing applications 113, 123, 133, 143, 153 and 163. Examples include desktop and laptop computers, tablets, smart phones, smart televisions, wearable devices (watches, glasses, etc.), and any other type of IoT device, of which computing system 901 is also representative.

Referring still to FIG. 1, configuration application 113 executes on computing system 111. As discussed herein, the configuration application 113 may be optional or may execute on another of computing system, 121, 131, 141, 151 or 161, in addition or in lieu of one or more other applications. The configuration application 113 can be representative of any application designed to configure event configuration information for one or more other consumer applications. The configuration application 113 may be a natively installed and executed application, a browser-based application, a mobile application, a streaming or streamed application, or any other type or application, variation, or combination thereof. The configuration application 113 can also be part of an application suite consisting of multiple applications that are bundled together.

The applications 113, 123, 133, 143, 153 and 163 execute on computing system, 121, 131, 141, 151 or 161. As shown in the example of FIG. 1, the producer applications 123, 133 and 143 can be representative of any applications designed to share data with other applications. For example, the producer applications 123, 133 and 143 can provide application data feeds to the data sharing platform 160. Likewise, the consumer applications 153 and 163 can be representative of any applications designed to utilize shared data generated by other, otherwise isolated, applications. The applications 113, 123, 133, 143, 153 and 163 may be a natively installed and executed application, a browser-based application, a mobile application, a streaming or streamed application, or any other type or application, variation, or combination thereof. The applications 113, 123, 133, 143, 153 and 163 can also be part of an application suite consisting of multiple applications that are bundled together.

The app servers 120, 130, 140, 150 and 160 may expose logic through a component API, such as, for example, the Enterprise JavaBean (EJB) component model found on Java 2 Platform, Enterprise Edition (J2EE) application servers. Additionally, the application servers 120, 130, 140, 150 and 160 may manage the own resources. The gate-keeping duties can include, but are not limited to, security, transaction processing, resource pooling, and messaging. The app servers may also employ various scalability and fault-tolerance techniques.

The applications (application server clients) can include GUIs (graphical user interface) running on a PC, mobile phone device, a Web server, or even other application servers. The information traveling back and forth between an application server and its app server client is not restricted to simple a particular display markup. Instead, the information is program logic that can take the form of data and method calls, the application server client can employ the exposed business logic in any manner that is suitable.

Prior to operation, applications 123, 133, 143, 153 and 163 register with the data sharing platform 160. For example, the applications 123, 133, 143, 153 and 163 can register by providing registration identification information to the data sharing platform 160. The registration identification information can include, for example, a user identifier or some other identification information that may be used by the data sharing platform 160 to correlate and subsequently identify related applications that are registered with the data sharing platform 160. The registration identification information may be stored in data repository 164.

The registration identification information can also include application identification information that may be used by the data sharing platform 160 to identify input or output capabilities of the application. The input capabilities can indicate the types of data feeds that the application can use while the output capabilities indicate the types of data feeds that the application can produce. Although not shown in the example of FIG. 1, in some embodiments, an application can be both a producer application and a consumer application.

Assuming the producer applications 123, 133, and 143 and the consumer applications 153 and 163 have previously registered with the data sharing platform 160, the configuration application 113 is used to set event configuration information for one or more other consumer applications. The configuration can include setting information for an event. The event configuration information may include an event setting identifies one or more actions to be executed by one or more consumer applications and timing information indicating when the one or more actions are to be executed. As discussed herein, in some embodiments the configuration application 113 may be optional. In such instances, event settings may be configured by, for example, consumer applications 153 and 163 or producer applications 123, 133, and 143.

The data sharing platform 160 may store the event configuration information in data repository 164. As illustrated in the example of FIG. 1, a manifest 165 is generated for each event configuration information entry (or instance). By way of example, FIG. 1 illustrates a "wakeup" event including event settings that identifies one or more actions to be executed by a light control consumer application 153 and an alarm application 163 and timing information indicating when the lights are to be turned on and the alarm is supposed to execute. A confidence level (or percentage) associated with each setting (or action) is determined by the decision service 162. As discussed herein, the confidence level may be used to identity the correct setting when multiple actions are set to trigger (or execute) within the same time window or frame.

Additionally, related producer applications can be identified and selected. For example, the data sharing platform can utilize a registration identifier included with a configuration request to identify other applications that are registered with the data sharing platform with the same registration identifier (e.g., same user). The other application may be executing on one or more different application platforms (including on the same application platform as a consumer application). As discussed herein, the identified applications may then be filtered such that only compatible applications are provided for selection (e.g., by a user of the registration application 113).

The compatible applications may be identified for each consumer application based on producer applications whose output capabilities match the input capabilities of the particular consumer application. As discussed herein, during the validation stage, application developers must provide the input capabilities of the application which can indicate the types of data feeds that the application can use and the output capabilities which can indicate the types of data feeds that the application can produce. Although not shown in the example of FIG. 1, in some embodiments, an application can be both a producer application and a consumer application.

In some embodiments, there may be multiple versions (e.g., v2.0, v2.1, etc.) of a data sharing platform, e.g., data sharing platform 150. A schema defines the capabilities that are available in each version of the data sharing platform and applications can self-declare, e.g., via a manifest, which capabilities are utilized during operation. If, for example, the application intends to use capabilities that are not available on a particular version of the data sharing platform then the application may be blocked from installation on that version of the platform. In this manner, incompatible applications may be blocked from installing on a particular platform or version of a platform.

As shown in the example of FIG. 1, multiple actions are configured for a "wakeup" event. Specifically, an initial or first setting of the event configuration information an alarm action is set to be triggered via an alarm application, e.g., application 163, and a lights action is set to be trigger via a smart light switch operator application, e.g., application 153. Additionally, producer applications 123 and 133 are selected as being producer applications associated with the alarm and lights actions.

As discussed herein, the decision service 162 includes a predictive analysis engine (not shown) capable of processing the producer data feeds 161, blending the feeds, and automatically configuring or reconfiguring event configuration information for the consumer applications 153 and 163. The decision service 162 generates consumer data feeds 169 which may be raw or filtered producer data feeds 161, one or more instructions or API calls to the consumer applications 153 and 163, or some combination or variation thereof. Likewise, producer data feeds 161 can be raw data feeds that are processed by the decision service 162, API calls to configure (or reconfigure) the event configuration information or some combination or variation thereof.

Figure 2A:
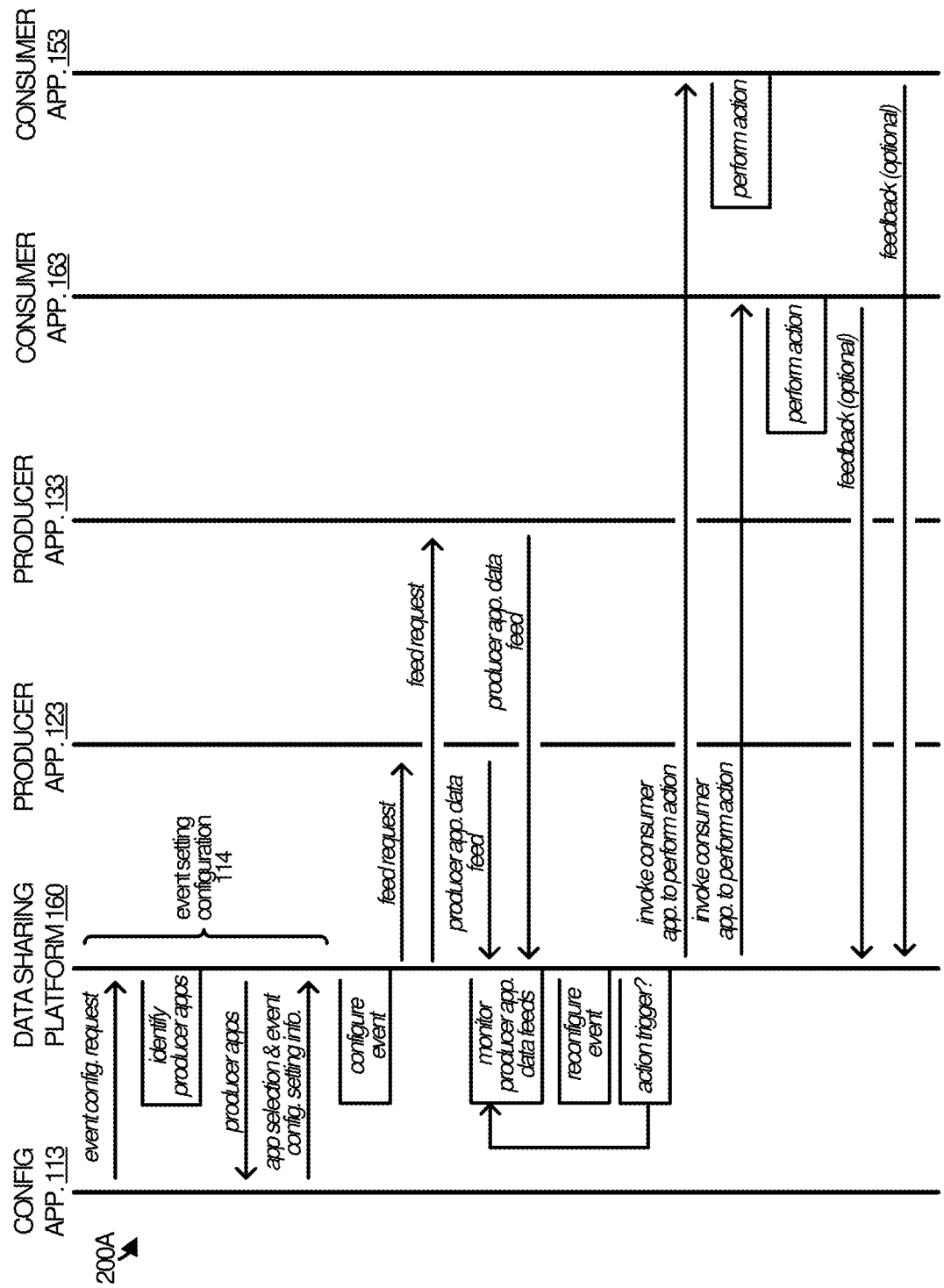
FIGS. 2A-2C illustrates example sequence diagrams depicting example operations of various components of example operational architecture for facilitating sharing of application data among multiple isolated applications executing on one or more application platforms, according to some embodiments.
Figure 2B:
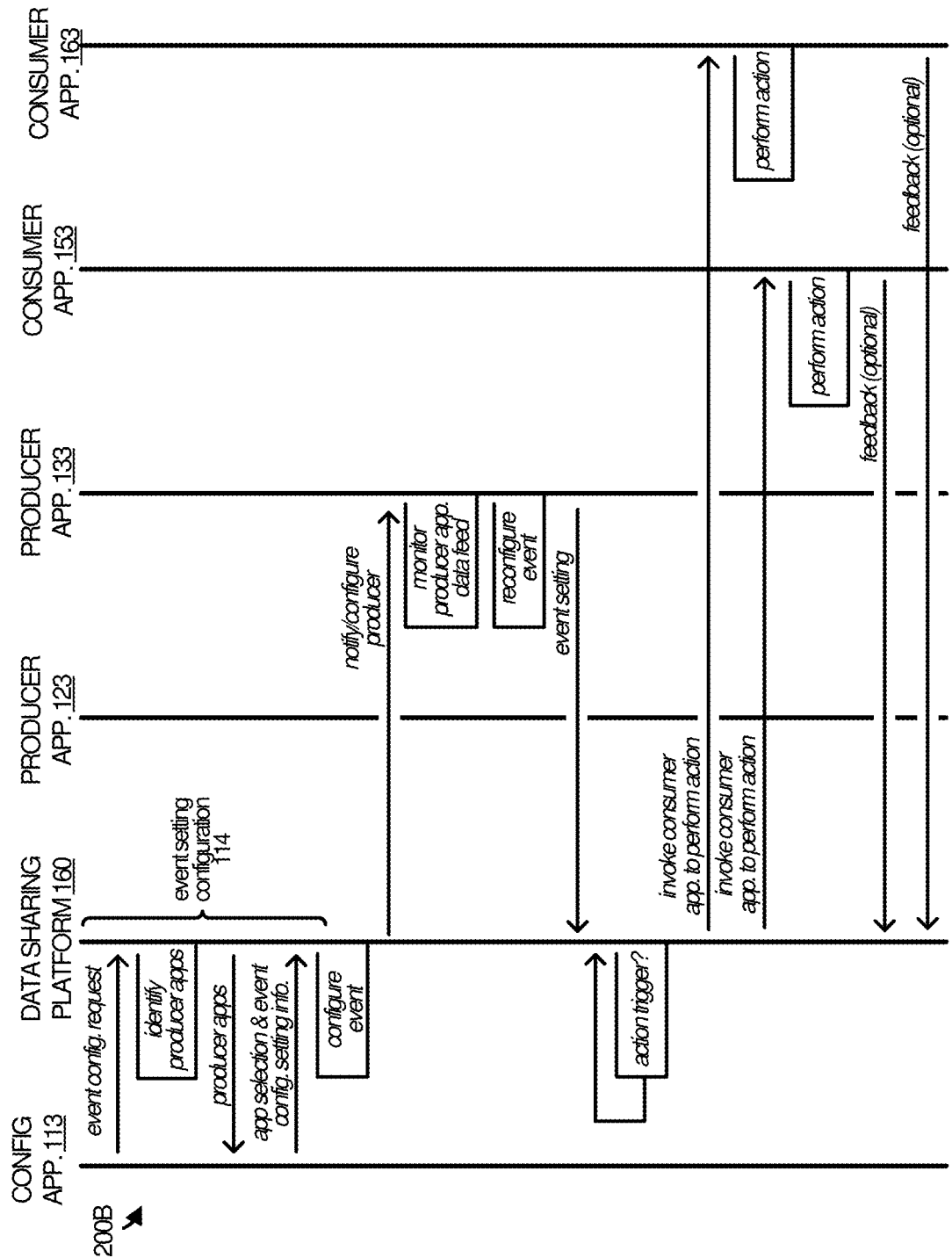
Figure 2C:
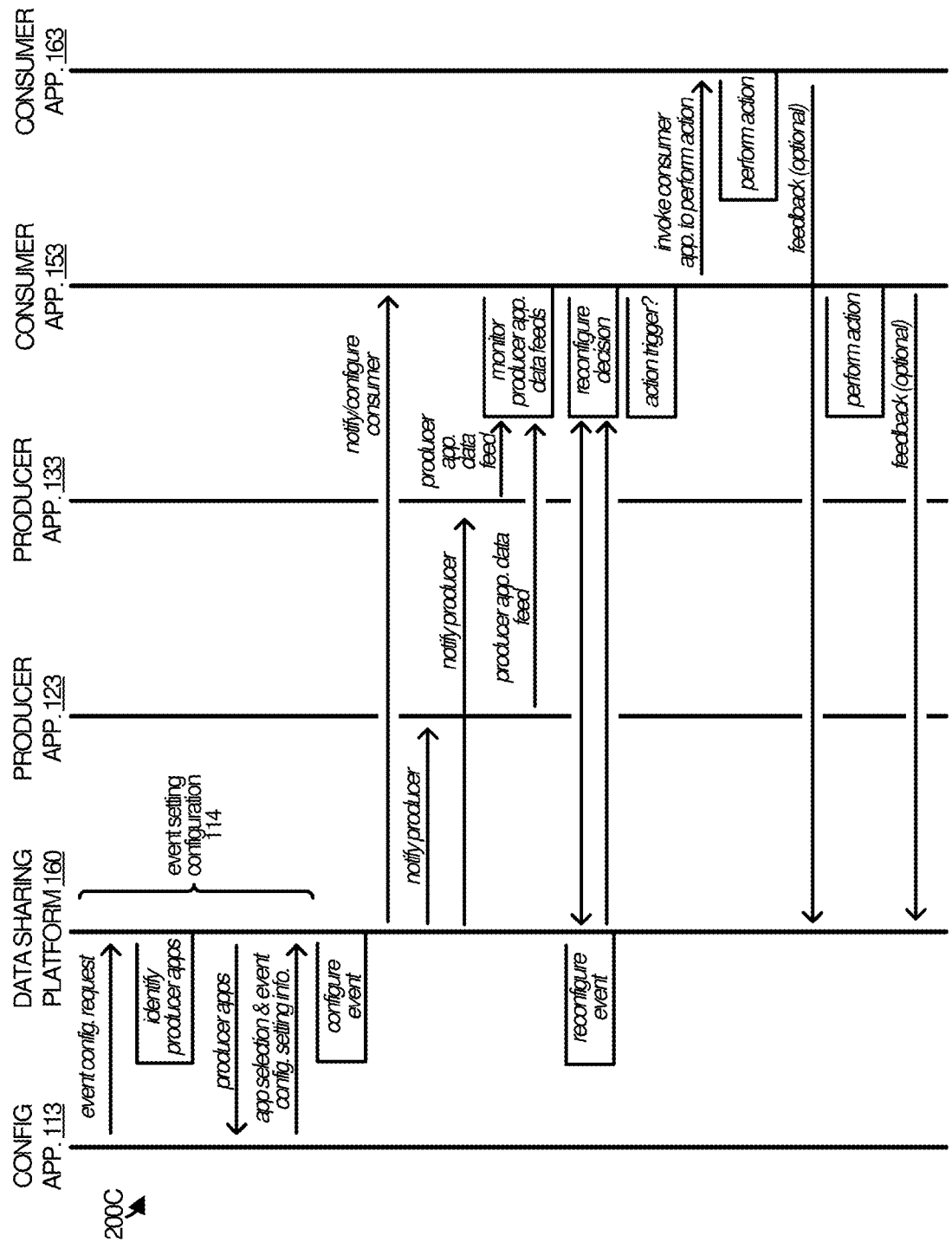

To further illustrate the operation of example operational architecture 100, FIGS. 2A-2C are provided.

FIGS. 2A-2C illustrates example sequence diagrams 200A-200C depicting example operations of various components of example operational architecture 100 of FIG. 1 for facilitating sharing of application data among multiple isolated applications executing on one or more application platforms, according to some embodiments. The sequence diagrams 200A-200C include configuration application 113, data sharing platform 160 (including decision service 162), producer application 123, producer application 133, consumer application 153 and consumer application 163. Additional or fewer components of the example operation architecture 100 are possible.

As discussed herein, prior to operation, application developers submit their applications to an application store (not shown) along with application capability information. Additionally, in some embodiments, applications can be preloaded into an instance of the platform. For example, a hardware manufacturer of a home waking service may submit and/or otherwise associate or pre-install certain complementary applications. The application capability can include input capabilities of the application indicating the types of application data feeds that the application can use (or receive) and output capabilities that indicate the types of application data feeds that the application can produce (or provide). Additionally, during the application submission process, the application can be assigned or provided an application identifier (ID).

The application is subsequently downloaded and registered with the data sharing platform 160. For example, the applications can register by providing registration identification information to the data sharing platform 160. The registration identification information can include a user identifier or some other identification information that may be used by the data sharing platform 160 to correlate and subsequently identify related applications that are registered with the data sharing platform 160. The registration identification information also includes an application ID that can be used to identify input and output capabilities of the application.

Referring first to the example operational sequence 200A of FIG. 2A, in operation, a user 112 configures an event via the configuration application 113. Initially, the configuration application 113 sends an event configuration request to the data sharing platform 160. As discussed herein, the event configuration request includes registration identification information that include one or more application identifiers and a user (or account) identifier. In the examples of FIGS. 2A-2C, the registration information includes application identifiers for consumer applications 153 and 163.

The data sharing platform 160 uses the user identifier to identify a set of other applications, e.g., producer applications, that are registered with the data sharing platform 160 with the same registration identifier (e.g., user identifier). The data sharing platform 160 uses the one or more application identifiers to filter the identified producer applications in order to identify a subset of producer applications that are compatible with each of one or more consumer applications 153 and 163. Identification or description of the subset(s) of producer applications are then provided to the user via the configuration application 113. The user 112 can select the one or more relevant producer applications for monitoring via the configuration application 113.

As shown in the example of FIGS. 2A-2C, producer applications 123 and 133 are selected by the user of the configuration application 113. The data sharing platform 160 associates the selected producer applications 123 and 133 with the event. For the purposes of discussion, producer application 123 can be a Weather data application such as, for example, The Weather Channel® Application capable of providing weather data based on a predetermined or current location. The producer application 133 can be a IoT hub device capable of measuring and/or otherwise detecting user sleep patterns, and producer application 143 can be a Traffic data application. Although not shown, the producer applications could also be a Calendaring application such as, for example, Microsoft Outlook®, or a variety of other applications, IoT applications, etc. Likewise, consumer application 153 can be a lights control consumer application 153 capable of, for example, controlling Philips IoT lightbulbs, e.g., in the user's bedroom during the wakeup event.

The user also provides event configuration setting for configuration of the event. The event configuration setting identifies one or more actions to be executed by one or more consumer applications and timing information indicating when the one or more actions are to be executed. For example, as shown in the example of FIG. 1, a "wakeup" event is shown including event settings that identify one or more actions to be executed. More specifically, a lights action is to be executed by a lights control consumer application 153 and an alarm action is to be executed by an alarm application 163. The timing associated with the actions is also provided.

The data sharing platform 160 configures the event in accordance with the received event configuration setting and generates a manifest 165 for the event. The data sharing platform 160 can also calculate a confidence level associated with the event configuration setting and/or one or more actions indicated by the event configuration setting.

By way of example, FIG. 1 illustrates a "wakeup" event including a first event setting that identifies one or more actions to be executed by a light control consumer application 153 and an alarm application 163 and timing information indicating when the lights are to be turned on and the alarm is supposed to execute. A confidence level (e.g., percentage) associated with each setting (or action) is determined by the decision service 162. As discussed herein, the confidence level may be used to identity the correct setting when multiple actions are set to trigger (or execute) within the same time window or frame.

Once configured, the data sharing platform 160 can obtain producer application data feeds in a number of ways. For example, the producer application data feeds can be pushed to the data sharing platform 160 or the data sharing platform 160 can periodically query the producer applications 123 and 133 for the data feeds or directly read the data from the producer applications 123 and 133, e.g., pull the producer data feeds.

As shown in the example of FIGS. 2A-2C, the data sharing platform 160 sends application data feed requests to producer applications 123 and 133. The producer applications 123 and 133, in turn, provide producer application data feeds to the data sharing platform 160. The producer application data feeds can be provided periodically, based on changes to the data or other triggering events, responsive to requests or queries or in other manners, including combinations or variations thereof.

The data sharing platform 160 monitors the producer application data feeds provided by the producer applications 123 and 133 associated with the event. In the course of monitoring the producer application data feeds, the data sharing platform 160 detects an event reconfiguration trigger based on the one or more application data feeds. Responsive to the event reconfiguration trigger, the data sharing platform 160 automatically modifies the event configuration information. The modification of the event configuration information can be made dynamically based on one or more machine learning models of a predictive analysis engine (not shown). The predictive analysis engine can be included as part of decision service 162.

In some embodiments, modifying the event configuration information can include generating an additional event setting for the event based on content of the one or more application data feeds and calculating a confidence level associated with the additional event setting. As shown in the example of FIG. 1, the additional event setting (e.g., setting 2) includes new alarm action with new timing information for the wakeup event. In the example of FIG. 1, a confidence level is also calculated for the addition event setting. For example, the setting 2 alarm has a confidence of 85% while the setting 1 (original setting) has a confidence of 50%. The data sharing platform 160 can determine that the event configuration information includes multiple event settings each identifying a same action, e.g., Alarm, to be executed within a window of time, e.g., between 5 A.M. and 6 A.M. and automatically select the event setting having a highest confidence level, e.g., setting 2. Accordingly, the Alarm timing information can be dynamically modified based on the producer data feeds 161.

The data sharing platform 160 continuously monitors timing information corresponding to configured events identified by the event configuration information to determine if one or more actions are set to execute. If so, the data sharing platform 160 directs the appropriate application platform(s) to invoke the consumer application(s) and perform the actions.

The consumer applications can optionally provide feedback to the data sharing platform which can be utilized by the data sharing platform 160 and, more particularly, decision service 162, to enhance the dynamic event reconfiguration. The feedback can take the form of telemetry data that is provided to the decision service 162 and/or application developers so that interaction patterns between applications can be better understood. Additionally, default behavior can be improved. For example, if the lights an IoT device could have an abort button on the device which, when pressed, can inform the decision service 162 that the action just taken was not appreciated (e.g. the lights were turned on too early). The data sharing platform 160 can adjust one or more machine learning models of the predictive analysis engine based on the feedback. For example, the feedback could result in a decrease of the preference rating for that same action in the future. This feedback data can also be used to improve algorithmic machine learning models across the user base of the data sharing platform 160 so that other users can also benefit from the enhanced system knowledge.

The example sequence diagrams 200B and 200C shown in FIGS. 2B and 2C, respectively, are similar to sequence diagram 200A with the exception that in sequence diagram 200B, producer application 133 is configured with additional functionality for monitoring at least its own producer application data feeds and automatically reconfiguring event configuration information by generating new event settings (or information) for one or more actions and providing the event setting to the data sharing platform 160. In some embodiments, the reconfiguration of event configuration information can include calculating a confidence level associated with the new event setting. Likewise, in sequence diagram 200C, consumer application 153 is configured with additional functionality for monitoring producer application data feeds and automatically reconfiguring event configuration information. Additionally, in the example of FIG. 2C, consumer application 153 automatically invokes consumer application 163 to perform an action.

Figure 3:
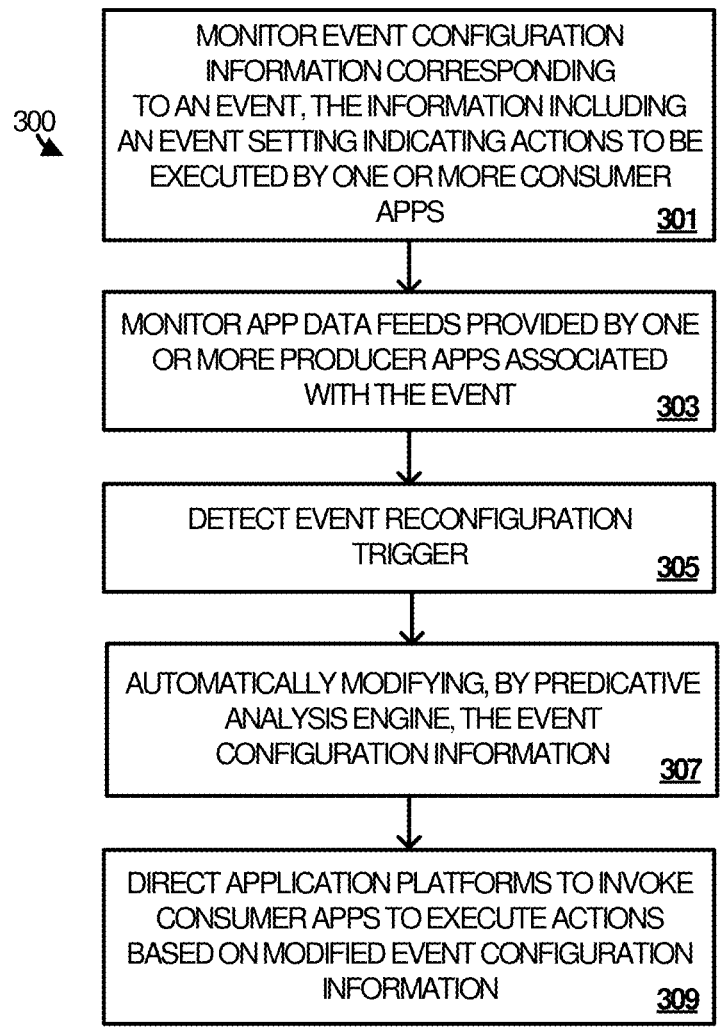
FIG. 3 depicts a flow diagram illustrating example operations of a decision service for sharing application data among multiple isolated applications executing on one or more application platforms, according to some embodiments.

FIG. 3 depicts a flow diagram illustrating example operations 300 of a decision service for sharing application data among multiple isolated applications executing on one or more application platforms, according to some embodiments. The example operations 300 may be performed in various embodiments by decision service 162 of FIG. 1, or one or more processors, modules, engines, components or tools of a data sharing platform 160 of FIG. 1.

To begin, at 301, the decision service monitors event configuration information corresponding to an event. As discussed herein, the event configuration information can include an event setting that identifies one or more actions to be executed by one or more consumer applications and timing information indicating when the one or more actions are to be executed.

At 303, the decision service monitors application data feeds provided by one or more producer applications associated with the event and, at 305, detects an event reconfiguration trigger based on the one or more application data feeds. For example, the event reconfiguration trigger can be caused by one or more predicted patterns as determined by the machine learning models of the predictive analysis engine.

Responsive to the event reconfiguration trigger, at 307, the decision service automatically modifies the event configuration information. More specifically, a predictive analysis engine of the decision service processes producer data feeds 161 and, in some instances, utilizes the machine learning algorithms to modify the event configuration.

Lastly, at 309, the decision service directs at least one of the one or more application platforms to invoke at least one of the one or more data consumer applications for execution of at least one of the one or more actions based, at least in part, on the modified event configuration information.

Figure 4:
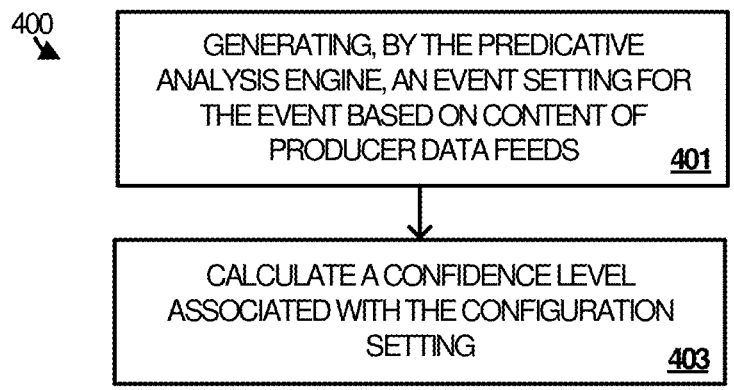
FIG. 4 depicts a flow diagram illustrating example operations of a decision service for modifying the event configuration information, according to some embodiments.

FIG. 4 depicts a flow diagram illustrating example operations 400 of a decision service for modifying the event configuration information, according to some embodiments. The example operations 400 may be performed in various embodiments by decision service 162 of FIG. 1, or one or more processors, modules, engines, components or tools of a data sharing platform 160 of FIG. 1.

To begin, at 401, the decision service generates an event setting for the event based on content of the producer data feeds. For example, as illustrated in the example of FIG. 1, a second setting (#2) is generated for the alarm action based on the producer data feeds 161. The action is to be executed once (i.e., does not reoccur) at 5:45 A.M. because the system has detected, for example, bad traffic, weather conditions, etc., based on the producer data feeds 161. Alternatively or additionally, the IoT hub may detect that sleeping patterns indicate that a user has had enough sleep or is otherwise ready to wake up. Although not shown, the system could also push the timing of the alarm back to say 6:15 A.M. if certain criteria are met.

Figure 5:
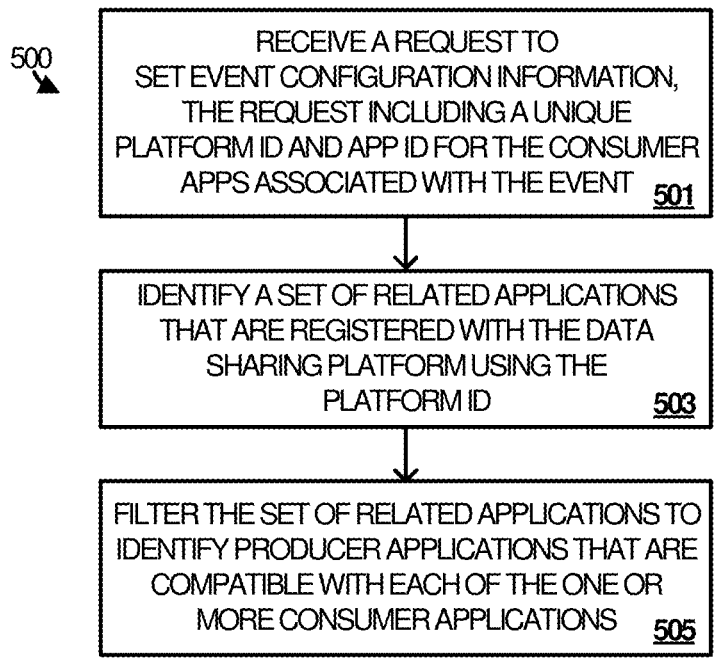
FIG. 5 depicts a flow diagram illustrating example operations of a decision service for identifying producer applications that are compatible with consumer applications during an event setting configuration, according to some embodiments.

FIG. 5 depicts a flow diagram illustrating example operations 500 of a decision service for identifying producer applications that are compatible with consumer applications during an event setting configuration, according to some embodiments. The example operations 500 may be performed in various embodiments by decision service 162 of FIG. 1, or one or more processors, modules, engines, components or tools of a data sharing platform 160 of FIG. 1.

To begin, at 501, the decision service receives a request to set event configuration information associated with an event. The request can include a platform identifier that uniquely identifies a user or account with the data sharing platform. Additionally, the request can include one or more application identifiers that identify one or more consumer applications associated with the event.

At 503, the decision service identifies a set of related applications that have registered with the data sharing platform using the unique platform identifier.

At 505, the decision service filters the set of related applications to identify producer applications that are compatible with the one or more consumer applications. In some embodiments, the filtering the applications to identify the producer applications that are compatible with each of the one or more consumer applications can include identifying input capabilities of a consumer application, identifying output capabilities of the set of related applications that have registered with the data sharing platform using the unique platform identifier, and selecting producer applications with output capabilities that match the input capabilities of the consumer application. The filtered applications are the producer applications that are compatible with the consumer application. In some embodiments, a group of applications can be selected for each consumer application associated with the event being configured. Additionally, both the consumer and the producer applications must be supported by the current version of the application data platform on which they are executing.

Although not shown in the example of FIG. 5, the decision service can provide the compatible producer applications to the configuration application for a user or configuration selection. In this manner, a user or configuration application can identify a subset of the compatible producer applications whose application data feeds should be monitored for the event.

Figure 6:
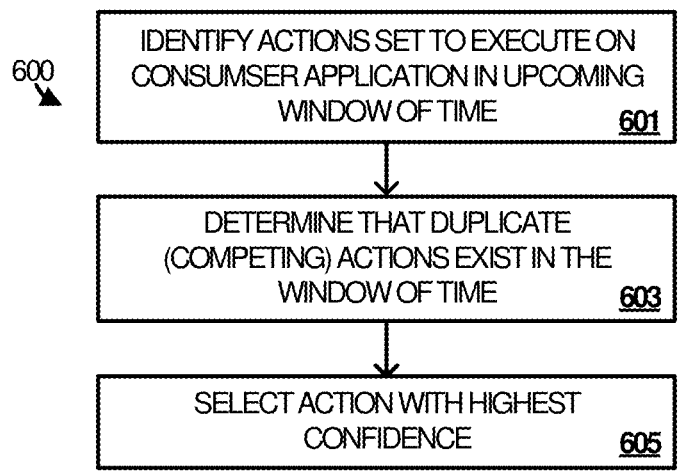
FIG. 6 depicts a flow diagram illustrating example operations of a decision service for identifying producer applications that are compatible with consumer applications during an event setting configuration, according to some embodiments.

FIG. 6 depicts a flow diagram illustrating example operations 600 of a decision service for identifying producer applications that are compatible with consumer applications during an event setting configuration, according to some embodiments. The example operations 600 may be performed in various embodiments by decision service 162 of FIG. 1, or one or more processors, modules, engines, components or tools of a data sharing platform 160 of FIG. 1.

To begin, at 601, the decision service identifies actions associated with an event that are set to execute in an upcoming window of time. The window of time can be a preconfigured window of time, dynamically selectable by the decision service, or determined in a variety of other manners including combinations or variations thereof. At 603, the decision service determines that duplicate (or competing) actions/settings exist for the same event in the same window of time and, at 605, selects the action with the highest confidence level.

For example, as shown in the example of FIG. 1, first configuration setting with an alarm action or component set to execute at 6 A.M. with a confidence level of 50% and a second configuration setting with an alarm action or component set to execute at 5:45 A.M. with a confidence level of 85%. The data sharing platform 160 can determine that the event configuration information includes multiple event settings each identifying a same action, e.g., Alarm, to be executed within a window of time e.g., between 5 A.M. and 6 A.M. Accordingly, the data sharing platform 160 can select the action with the highest confidence, e.g., the alarm from the second setting.

Figure 7:
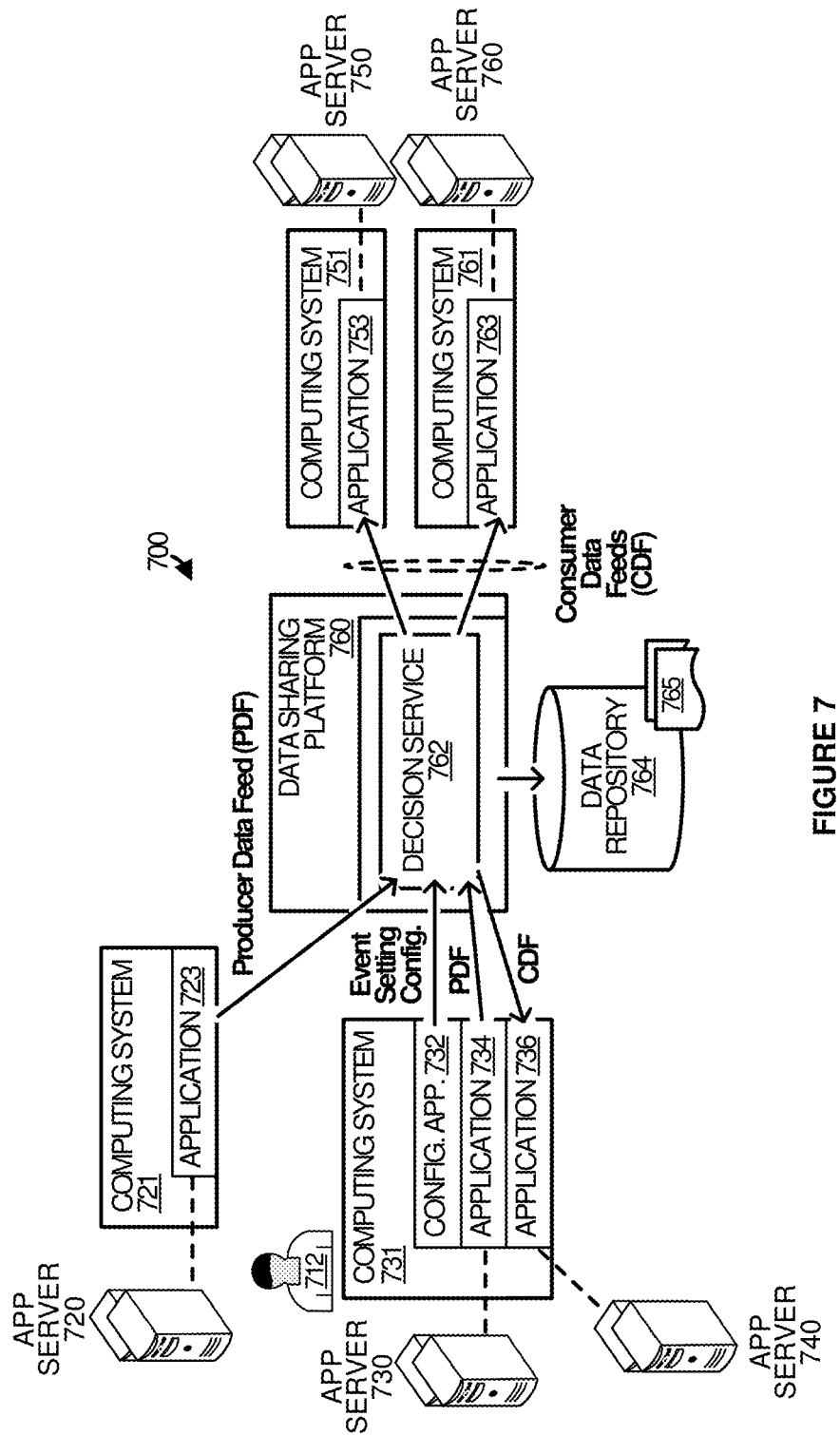
FIG. 7 depicts a block diagram illustrating an example operational architecture for sharing application data among multiple isolated applications executing on one or more application platforms (or computing systems), according to some embodiments.

FIG. 7 depicts a block diagram illustrating an example operational architecture 700 for sharing application data among multiple isolated applications executing on one or more application platforms (or computing systems), according to some embodiments. More specifically, the example operational architecture 700 is similar to the example operational architecture 100 of FIG. 1, but illustrates an embodiment whereby otherwise isolated applications, including a configuration application 732, coexist with other applications on the same computing system and, in some instances, in the same runtime environment. The applications are able to share application data via a data sharing platform 760.

The example operational architecture 700 includes computing systems 721, 731, 751 and 761, a data sharing platform 760, and application ("app") servers 120, 130, 140, 150 and 160. The data sharing platform 760 can be the data sharing platform 160 of FIG. 1, although alternative configurations are possible.

As shown in the example of FIG. 7, producer application 723 executes on computing system 721, configuration application 732, producer application 734, and consumer application 736 execute on computing system 731, application 753 executes on computing system 751 and application 763 executes on computing system 761. The computing systems 721, 731, 751 and 761 can be computing systems 121, 131, 151, and 161, of FIG. 1, respectively, although alternative configurations are possible. Likewise, producer, consumer and configuration applications can operate in the same or similar manner to the operation as discussed with reference to the example of FIG. 1.

Figure 8:
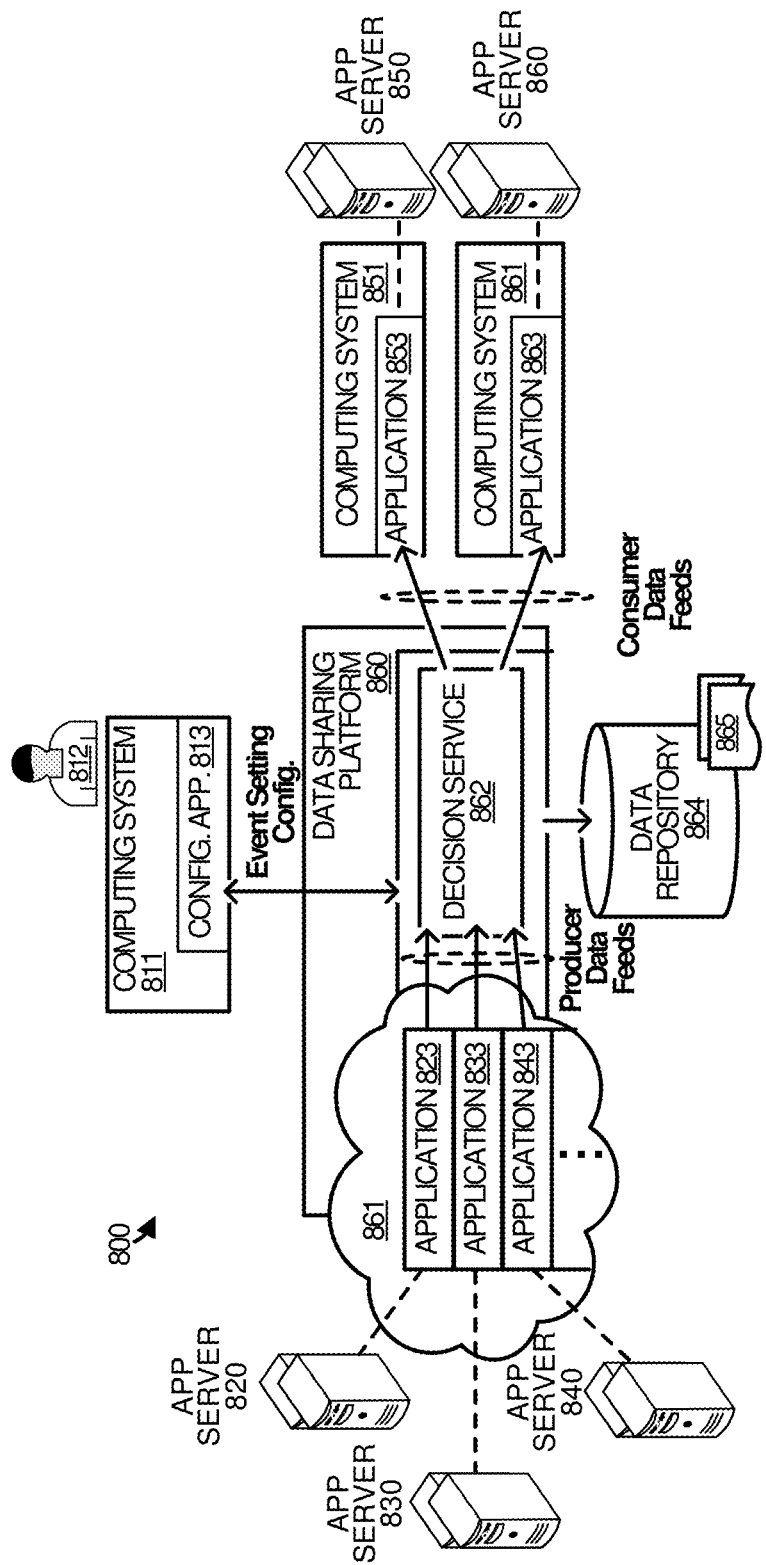
FIG. 8 depicts a block diagram illustrating an example operational architecture for sharing application data among multiple isolated applications, including cloud-based applications, executing on one or more application platforms (or computing systems), according to some embodiments.

FIG. 8 depicts a block diagram illustrating an example operational architecture 800 for sharing application data among multiple isolated applications, including cloud-based applications, executing on one or more application platforms (or computing systems), according to some embodiments. The example operational architecture 800 is similar to the example operational architecture 100 of FIG. 1, but illustrates an embodiment whereby various producer applications 823, 833, and 843 are executed on behalf of user 812 on a processing system in cloud 861. Cloud 861 may be part of the data sharing platform or a distinct component of operational architecture 800.

The example operational architecture 800 includes computing systems 813, 851 and 861, a data sharing platform 860, and application ("app") servers 820, 830, 840, 850 and 860. The data sharing platform 860 can be the data sharing platform 160 of FIG. 1, although alternative configurations are possible.

As shown in the example of FIG. 8, producer applications 823, 833, and 843 execute on a processing (or application system) in cloud 861 after being configured by user 812. For example, user 812 can configure a Weather app 823 to provide weather information based on a fixed location of the user. Alternatively, the location of the user 812 can be periodically sent to the cloud-based application. The producer applications 823, 833, and 843 can provide producer data feeds to the decision service 862. The producer, consumer and configuration applications can operate in the same or similar manner to the operation as discussed with reference to the example of FIG. 1.

Figure 9:
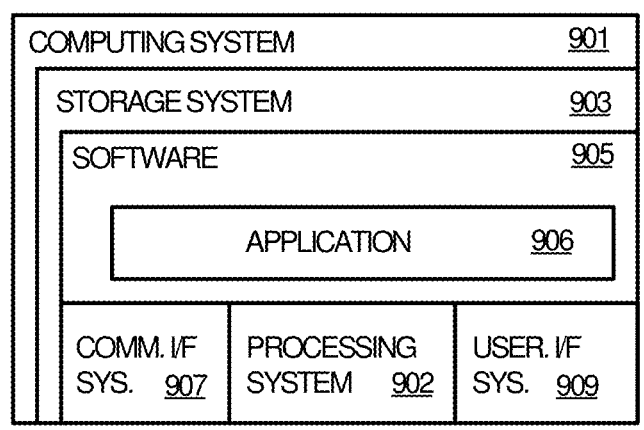
FIG. 9 is a block diagram illustrating a computing system suitable for implementing the scope-based certificate deployment technology disclosed herein, including any of the applications, architectures, elements, processes, and operational scenarios and sequences illustrated in the Figures and discussed below in the Technical Disclosure.

FIG. 9 illustrates computing system 901, which is representative of any system or collection of systems in which the various applications, services, scenarios, and processes disclosed herein may be implemented. For example, computing system 901 may include server computers, blade servers, rack servers, and any other type of computing system (or collection thereof) suitable for carrying out the enhanced collaboration operations described herein. Such systems may employ one or more virtual machines, containers, or any other type of virtual computing resource in the context of supporting enhanced group collaboration.

Computing system 901 may be implemented as a single apparatus, system, or device or may be implemented in a distributed manner as multiple apparatuses, systems, or devices. Computing system 901 includes, but is not limited to, processing system 902, storage system 903, software 905, communication interface system 907, and user interface system 909. Processing system 902 is operatively coupled with storage system 903, communication interface system 907, and an optional user interface system 909.

Processing system 902 loads and executes software 905 from storage system 903. When executed by processing system 902 for deployment of scope-based certificates in multi-tenant cloud-based content and collaboration environments, software 905 directs processing system 902 to operate as described herein for at least the various processes, operational scenarios, and sequences discussed in the foregoing implementations. Computing system 901 may optionally include additional devices, features, or functionality not discussed for purposes of brevity.

Referring still to FIG. 9, processing system 902 may comprise a micro-processor and other circuitry that retrieves and executes software 905 from storage system 903. Processing system 902 may be implemented within a single processing device, but may also be distributed across multiple processing devices or sub-systems that cooperate in executing program instructions. Examples of processing system 902 include general purpose central processing units, application specific processors, and logic devices, as well as any other type of processing device, combinations, or variations thereof.

Storage system 903 may comprise any computer readable storage media readable by processing system 902 and capable of storing software 905. Storage system 903 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 903 may also include computer readable communication media over which at least some of software 905 may be communicated internally or externally. Storage system 903 may be implemented as a single storage device, but may also be implemented across multiple storage devices or sub-systems co-located or distributed relative to each other. Storage system 903 may comprise additional elements, such as a controller, capable of communicating with processing system 902 or possibly other systems.

Software 905 may be implemented in program instructions and among other functions may, when executed by processing system 902, direct processing system 902 to operate as described with respect to the various operational scenarios, sequences, and processes illustrated herein. For example, software 905 may include program instructions for directing the system to perform the processes described with reference to FIGS. 3-6.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 905 may include additional processes, programs, or components, such as operating system software, virtual machine software, or application software. Software 905 may also comprise firmware or some other form of machine-readable processing instructions executable by processing system 902.

In general, software 905 may, when loaded into processing system 902 and executed, transform a suitable apparatus, system, or device (of which computing system 901 is representative) overall from a general-purpose computing system into a special-purpose computing system. Indeed, encoding software on storage system 903 may transform the physical structure of storage system 903. The specific transformation of the physical structure may depend on various factors in different implementations of this description. Examples of such factors may include, but are not limited to, the technology used to implement the storage media of storage system 903 and whether the computer-storage media are characterized as primary or secondary storage, as well as other factors.

For example, if the computer readable storage media are implemented as semiconductor-based memory, software 905 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 907 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 909 may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 909. In some cases, the input and output devices may be combined in a single device, such as a display capable of displaying images and receiving touch gestures. The aforementioned user input and output devices are well known in the art and need not be discussed at length here. In some cases, the user interface system 909 may be omitted when the computing system 901 is implemented as one or more server computers such as, for example, blade servers, rack servers, or any other type of computing server system (or collection thereof).

User interface system 909 may also include associated user interface software executable by processing system 902 in support of the various user input and output devices discussed above. Separately or in conjunction with each other and other hardware and software elements, the user interface software and user interface devices may support a graphical user interface, a natural user interface, or any other type of user interface, in which a user interface to a productivity application may be presented.

Communication between computing system 901 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. In any of the aforementioned examples in which data, content, or any other type of information is exchanged, the exchange of information may occur in accordance with any of a variety of well-known data transfer protocols.

Example Operational Scenarios

As discussed herein, a data sharing platform is described. In some operational scenarios, the data sharing platform can be, for example, an IoT-connected intelligent pluggable decision engine service (IPDES). In one simplified example of operation, a 'wake up service' is described which includes a basic alarm clock configuration app and two other apps installed: a "weather monitor" app and "light switch operator" app.

A configuration app (e.g., which may be a smartphone app, or a custom app leveraging buttons on a physical IoT device) can store basic user preferences which can be read by other apps on the device:

App ID (e.g. 1)
Enable alarm (e.g. True)
Weekday alarm time (e.g. 7 am)
Weekend alarm time (e.g. 8:30 am)
Action 0: Ring tone ID (e.g. 6)
Snooze (e.g. 5 mins)

In this operational scenario, the wake up service has predefined input APIs that are known to other apps installed on the device:

Next Alarm Time (time, Confidence %)
Next Alarm Action (App ID, Action ID, Strength of Preference %, SoundExclusivity True/False)

In this example, the basic configuration app may be used to write the setting to the IPDES APIs on a Tuesday afternoon for the following Wednesday morning. The alarm app has logic to update its preference periodically (e.g., at least once a day), so that the alarm time changed on Friday vs. Saturday:

Next Alarm Time (Weds 7:00 am, 50%)
Next Alarm Action (App=1, Action=0, Preference=50%, Type=Sound, TimeDelta=0 minutes)

Using just this one app, the IPDES intelligence engine has a simple choice—at 7:00 A.M., the engine will invoke App 1, action 0. This causes the alarm clock app to be invoked and, once invoked, the alarm clock app looks up that it is meant to ding with ringtone 6 at the exact time that the alarm goes off. The preferences indicate that the alarm clock keeps ringing until the user clicks snooze, at which point it adds 5 minutes to the current time (7:01), writes Next Alarm Time (Wednesdays 7:06, 50%) and the user then clicks Off. At this point, the alarm clock writes that the next alarm is (Thurs 7:00, 50%).

When the weather app is installed (and configured for the local area), a user may program it so that if it rains, the alarm goes off 15 minutes earlier than the alarm. In this scenario, the Weather service will check periodically to see if the alarm will go off within 30 minutes. If this is the case, the weather service will write: Next Alarm Time (Thurs 6:45, Confidence=60%). On the Thursday morning, the intelligence engine will see that during there are competing related Alarm Times in the same time window, and it will pick the app with higher confidence. The action at this point is still the same (play the ringtone) so the act of waking up is identical.

When the lighting app is installed, the user may specify that the lights are meant to go on 20 minutes earlier than the alarm. Thus on Monday, for example, the lighting app might call the following APIs:

Next Alarm Action (App=2, Action=3 (e.g. turn on soft lights), preference=80%, Type=Environmental, TimeDelta=−20 minutes)

The IPDES service then makes two decisions: (1) when is the next event (e.g. waking up) to be scheduled, and (2) what action(s) should be taken and when, relative to the event schedule time. Assuming the weather is sunny, the alarm time will be 7:00 A.M. However, the decision engine sees that the lighting app must be invoked at 6:40 A.M. It further sees that Ringtone should be played at 7:00 A.M.

This simplified operational scenario illustrates various concepts. First, the intelligent pluggable service (IPDES) includes a set of network/internet-connected apps and a set of APIs in the IPDES which can be called by the apps to specify actions to take and when to schedule those actions. Second, once the action is taken for a given time period (be it that an alarm has gone off on a morning) that the actions are reset for the next time period (e.g. that the next day's alarm gets set).

Further, as discussed above, the system can further include feedback loops. The IoT device could have an abort button on device, which when pressed could inform the IPDES service that the action just taken was not appreciated (e.g. the lights were turned on too early). This in turn can lower the preference rating for that same action in the future. Moreover, the data can be shared with other users and can affect app store rating, etc.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of operating a decision service for sharing application data among multiple isolated applications executing on one or more application platforms, the method comprising:
   detecting an event reconfiguration trigger based on data contained in one or more application data feeds;
   responsive to the event reconfiguration trigger, automatically modifying, by a predictive analysis engine of the decision service, event configuration information associated with an event,
      wherein the event configuration information corresponds to an event setting that identifies an action to be executed by a consumer application; and
   directing at least one of the one or more application platforms to execute the action based, at least in part, on the modified event configuration information.

2. The method of claim 1, further comprising:
   receiving, by a data sharing platform, a request to set the event configuration information associated with the event,
      wherein the request includes a unique platform identifier;
   identifying a set of related applications that have registered with the data sharing platform using the unique platform identifier; and
   filtering the set of related applications to identify producer applications that are compatible with the one or more consumer applications.

3. The method of claim 2, wherein filtering the set of related applications to identify the producer applications that are compatible with the one or more consumer applications comprises:
   identifying input capabilities of a particular consumer application of the one or more consumer applications;
   identifying output capabilities of the set of related applications that have registered with the data sharing platform using the unique platform identifier; and
   selecting applications with output capabilities that match the input capabilities of the particular consumer application.

4. The method of claim 3, wherein selecting the applications with output capabilities that match the input capabilities of the particular consumer application further comprises:
   identifying a current version of the data sharing platform; and
   ensuring that the selected applications are supported by the current version of the platform.

5. The method of claim 2, further comprising:
   providing the producer applications that are compatible with the one or more consumer applications to a configuration application;
   receiving a response from the configuration application, wherein the response includes a selection indicating the one or more producer applications associated with the event.

6. The method of claim 1, wherein at least one of the one or more consumer applications or one or more producer applications comprises an Internet of Things (IoT) device.

7. The method of claim 1, wherein the predictive analysis engine maintains one or more machine learning models for determining how to modify the event configuration information.

8. The method of claim 7, further comprising:
   responsive to invoking the one or more consumer applications to execute the one or more actions, receiving feedback generated by at least one of the one or more consumer applications;
   adjusting the one or more machine learning models of the predictive analysis engine based on the feedback.

9. An application data sharing platform comprising:
   one or more computer readable storage media;
   a processing system operatively coupled with the one or more computer readable storage media; and
   a decision service for sharing application data among multiple isolated applications executing on one or more application platforms stored on the one or more computer readable storage media and comprising program instructions that, when executed by the processing system, direct the processing system to:
   detect an event reconfiguration trigger based on data contained in one or more application data feeds;
   responsive to the event reconfiguration trigger, automatically modify, by a predictive analysis engine of the decision service, event configuration information associated with an event,
      wherein the event configuration information corresponds to an event setting that identifies an action to be executed by a consumer application; and
   direct at least one of the one or more application platforms to execute the actions invoke at least one of the one or more consumer applications for execution of at least one of the one or more actions based, at least in part, on the modified event configuration information.

10. The application data sharing platform of claim 9, wherein the program instructions, when executed by the processing system, further direct the processing system to:
    process a request to set the event configuration information associated with the event, wherein the request includes a unique platform identifier;
    identify a set of related applications that have registered with the data sharing platform using the unique platform identifier; and
    filter the set of related applications to identify producer applications that are compatible with the one or more consumer applications.

11. The application data sharing platform of claim 10, wherein to filter the set of related applications to identify the producer applications that are compatible with the one or more consumer applications, the instructions, when executed by the processing system, further direct the processing system to:
    identify input capabilities of a particular consumer application of the one or more consumer applications;
    identify output capabilities of the set of related applications that have registered with the data sharing platform using the unique platform identifier; and
    select applications with output capabilities that match the input capabilities of the particular consumer application.

12. The application data sharing platform of claim 9, wherein the program instructions, when executed by the processing system, further direct the processing system to:
    generate an additional event setting for the event based on content of the one or more of the application data feeds; and
    calculate a confidence level associated with the additional event setting.

13. The application data sharing platform of claim 9, wherein the program instructions, when executed by the processing system, further direct the processing system to:

determine that the event configuration information includes multiple event settings each identifying a same action to be executed within a window of time; and select the event setting having a highest confidence level.

14. The application data sharing platform of claim 9, wherein the program instructions, when executed by the processing system, further direct the processing system to:

maintain one or more machine learning models for determining how to modify the event configuration information.

15. The application data sharing platform of claim 14, wherein the program instructions, when executed by the processing system, further direct the processing system to:

responsive to invoking the one or more consumer applications to execute the one or more actions, process feedback generated by at least one of the one or more consumer applications; and adjust the one or more machine learning models of the predictive analysis engine based on the feedback.

16. An apparatus comprising:

one or more computer readable storage media having a decision service for sharing application data among multiple isolated applications executing on one or more application platforms stored thereon, the decision service comprising program instructions which, when executed by a processing system, direct the processing system to at least:

detect an event reconfiguration trigger based on data contained in one or more application data feeds;

responsive to the event reconfiguration trigger, automatically modify, by a predictive analysis engine of the decision service, event configuration information associated with an event, wherein the event configuration information corresponds to an event setting that identifies an action to be executed by a consumer application; and direct at least one of the one or more application platforms to execute the action based, at least in part, on the modified event configuration information.

17. The apparatus of claim 16, wherein the program instructions, when executed by the processing system, further direct the processing system to:

process a request to set the event configuration information associated with the event, wherein the request includes a unique platform identifier;

identify a set of related applications that have registered with the data sharing platform using the unique platform identifier; and filter the set of related applications to identify producer applications that are compatible with the one or more consumer applications.

18. The apparatus of claim 17, wherein to filter the set of related applications to identify the producer applications that are compatible with the one or more consumer applications, the instructions, when executed by the processing system, further direct the processing system to:

identify input capabilities of a particular consumer application of the one or more consumer applications;

identify output capabilities of the set of related applications that have registered with the data sharing platform using the unique platform identifier; and select applications with output capabilities that match the input capabilities of the particular consumer application.

19. The apparatus of claim 16, wherein the program instructions, when executed by the processing system, further direct the processing system to:

monitor the application data feeds provided by the producer applications.

20. The apparatus of claim 16, wherein the program instructions, when executed by the processing system, further direct the processing system to:

monitor the event configuration information.

* * * * *